Jan. 8, 1963  G. MORESSÉE ET AL  3,072,814
ROTARY MACHINES FOR CONVERTING ELECTRICAL ENERGY
Filed Feb. 13, 1961
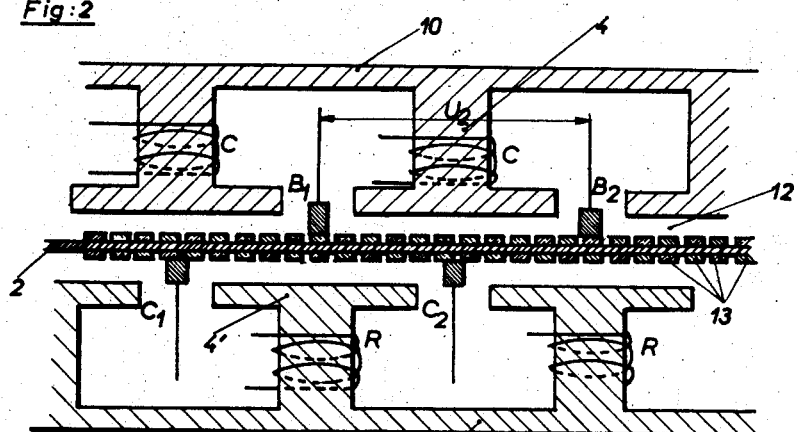
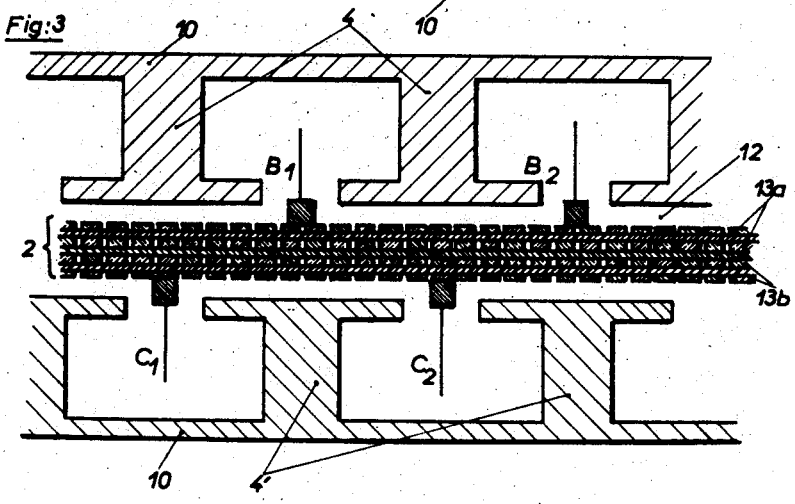
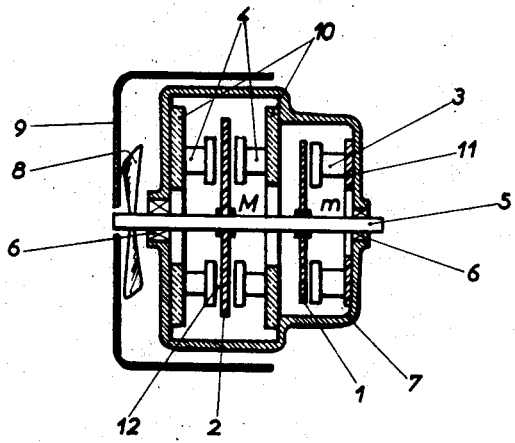
Inventors:
Georges Moressée
and
Robert Séchet
by Robert Henderson
attorney United States Patent Office 3,072,814
Patented Jan. 8, 1963

3,072,814
ROTARY MACHINES FOR CONVERTING
ELECTRICAL ENERGY
Georges Moressée, Neuilly-sur-Seine, and Robert Déchet, Boulogne-sur-Seine, France, assignors to Normacem, Paris, France, a company of France
Filed Feb. 13, 1961, Ser. No. 88,936
Claims priority, application France Feb. 18, 1960
4 Claims. (Cl. 310—268)

The present invention relates to rotary electrical machines of the so-called "metadyne" type. These multiple-brush machines lend themselves to numerous applications and are generally used to convert electrical energy.

More precisely, the machine in question may be called upon to convert D.C. current: it receives this current at a voltage $U_1$ and a current intensity $I_1$ and restores it at a voltage $U_2$ and a current intensity $I_2$, the product $U_2I_2$ being equal to the product $U_1I_1$ to within the efficiency factor. In particular, it is possible to effect a conversion with $U_1$ and $I_2$ constant; in other words, the machine of the type referred to above enables a constant voltage supply to be converted into a constant current supply and this conversion is furthermore reversible.

Conventional metadyne converters, although satisfactory in many respects, have a number of drawbacks:

(1) They have bulky windings. The behavior of metadyne converters is important, not only during normal running, but also during transitory phases; in particular, the response of the machine to varying control conditions must be quick (no time lag), faithful (no divergence between input and output), and smooth (no instability). These requirements are achieved, in conventional machines, by canceling all mutual inductances by means of bulky compensation or neutralizing windings for both the load circuit and the control circuit.

(2) They have expensive, complex strip collectors and pole arrangements. With regard to the problem of commutation, conventional metadynes have, for the input and output brushes, one or more strip collectors of relatively complex and expensive construction. Moreover, in order to obtain a proper commutation, it is necessary to reduce the field in the zone of the output brushes, which results in a more complicated design of the poles and usually in the use of auxiliary poles carrying windings energized by both the input and output currents.

The main object of the present invention is to provide an improved rotary electrical converter of the "metadyne" type, free from the above defects and of a simple and economical construction. More specifically, the machine of the present invention, as distinguished from conventional converters of the above type, does not require bulky windings, or auxiliary poles, or any special means for compensating armature reaction. Indeed, the machine of the present invention has an armature of very low electromagnetic inertia as regards both circuits and a correspondingly low time-constant.

While conventional metadyne converters have ordinary, bulky windings made of loops of properly insulated wire wound on a cylindrical iron support which rotates in an air-gap of considerable axial width, the machine, in accordance with the present invention, has a disk-shaped armature of insulating material carrying one or more flat windings with bare strip conductors and rotating in a flat, planar air-gap. Although the latter type of armatures are known per se, they have never been used, as far as we are aware, in metadyne converters with the technical advantages herein set forth.

It is a further object of our invention to provide a rotary electrical machine of the type referred to, in which the armature carrying the flat winding or windings with strip conductors rotates between two sets of poles arranged on either side of the armature and mutually offset electrically by ninety degrees. These poles, which are preferably poles devoid of prior magnetization, may carry, on the one hand, compensation and where necessary stabilization windings connected to the load circuit and, on the other hand, regulating windings connected to the control circuit, it being immaterial whether the compensation windings belong to one or the other of the circuits.

The description which follows with reference to the accompanying drawing given by way of example only and not in a limiting sense will give a clear understanding of how the invention may be performed, such particularities as become apparent from the specification or the drawing evidently falling within the scope of the invention.

Referring now to the drawing, FIGURE 1 is an axial section schematically illustrating an embodiment of the converter set in accordance with the invention.

FIGURE 2 is a detail sectional view of part of a machine in accordance with one possible embodiment of the invention.

FIGURE 3 is a similar section view of a variant.

Referring now to FIGURE 1, the converter set illustrated comprises a metadyne machine M and a drive motor m. The latter possesses a disk-shaped armature 1 carrying a flat winding with strip conductors which may be executed by the "printed circuit" method familiar to the art, and this disk rotates opposite a permanent magnet type field magnet 3 and is fixed to a shaft 5.

On this same shaft is mounted the armature of the machine M, and this armature likewise consists, in accordance with the invention, of a disk 2 carrying a flat winding with strip conductors 13 (see FIG. 2) which may also be executed by the printed circuit method. This disk rotates in a flat air gap 12 bounded by a field magnet comprising a double row of poles 4 devoid of prior magnetization arranged on either side of the armature disk 2.

Each of the two rows of poles 4 is rigidly secured to an annular head 10 fixed to the frame 7. A similar head 11 is provided for the field magnet 3 of drive motor m.

The shaft 5 is mounted in anti-friction bearings 6—6 carried by the frame 7 and drives a blower 8 housed in an enclosure 9.

As shown in FIGURE 2, the poles 4 of one of the field magnet rows (the row corresponding to the load circuit) may carry compensation windings C to which may be associated stabilizer windings, regulating windings R being arranged on the poles 4' in the other row of the field magnet (the row corresponding to the control circuit). The compensation windings, however, may be arranged on these latter poles 4'. The poles 4 are electrically offset by ninety degrees relative to the poles 4'. The absence of auxiliary poles and commutation windings will be noted, the reasons therefor having been set out precedingly.

The working voltage $U_2$ is tapped across brushes $B_1$ and $B_2$, and these brushes are in rubbing contact with strip conductors placed on one face of disk 2, while control brushes $C_1$ and $C_2$ electrically connected to the source of power (a storage battery, say) are in rubbing contact with strip conductors placed on the opposite face of disk 2. Control brushes $C_1$, $C_2$ may be inserted between the control circuit poles 4' and the load circuit brushes $B_1$, $B_2$ between the load circuit poles 4, or by way of a variant, these brushes may be located on the axis of their respective poles, depending on the design used for the windings.

The armature 2, rotating in the plane air gap 12 bounded by the poles 4 and 4' of the load and control circuits respectively, may be executed with a single flat winding with strip conductors 13, as shown in FIGURE 2, or with two independent windings 13a, 13b, as shown in FIGURE 3. This latter arrangement enables the current density in certain parts of the winding to be restricted, and such an arrangement was described by us in our U.S.A. application filed March 2, 1960, Serial Number 12,395.

It is to be clearly understood that many modifications can be made to the embodiments described hereinabove without departing from the scope of the invention, in particular by resorting to substitute but analogous technical means.

What is claimed is:

1. A rotary electric machine of the so-called "metadyne" type, comprising a disk-shaped armature having a flat winding comprising strip conductors, and two separate sets of poles at opposite sides of said armature and defining therebetween a generally planar air-gap, the poles of each of said sets being offset by 90 electrical degrees relatively to the poles of the opposite set.

2. A rotary electric machine of the so-called "metadyne" type having a control circuit and a load circuit, comprising a disk-shaped armature having a flat winding comprising strip conductors, two separate sets of poles facing toward each other and substantially devoid of premagnetization, said sets of poles, which correspond respectively with said control circuit and said load circuit, being disposed at opposite sides of said armature and defining therebetween a generally planar air-gap, the poles of one set being offset by 90 electrical degrees relatively to the poles of the opposite set, compensation windings on the poles of one of said sets, and regulating windings on the poles of the set corresponding to the control circuit.

3. A machine as claimed in claim 2, wherein the compensation windings are on the poles of the set corresponding to the load circuit.

4. A rotary electric machine of the so-called "metadyne" type, comprising a field magnet which includes two spaced sets of poles arranged in substantially parallel planes and defining therebetween a generally planar air-gap, and the poles of each of said sets being offset electrically by 90 degrees relatively to the poles of the other of said sets, a disk-shaped armature rotatably disposed in said air-gap in concentric relation to said poles and having a flat winding comprising strip conductors, and means for rotating said armature.

References Cited in the file of this patent

FOREIGN PATENTS 174,775     Switzerland _____ Jan. 31, 1935